United States Patent
Figoli et al.

(10) Patent No.: US 11,517,860 B2
(45) Date of Patent: Dec. 6, 2022

(54) MEMBRANES CONTAINING POLYMERIZED IONIC LIQUID FOR USE IN GAS SEPARATION

(71) Applicants: CONSIGLIO NAZIONALE DELLE RICERCHE, Rome (IT); UNIVERSITÁ DI PISA, Pisa (IT); UNIVERSITÁ DELLA CALABRIA, Arcavacata di Rende (IT)

(72) Inventors: Alberto Figoli, Rome (IT); Francesco Galiano, Rome (IT); Giuseppe Barbieri, Rome (IT); Adele Brunetti, Rome (IT); Lidietta Giorno, Rome (IT); Christian Silvio Pompelli, Pisa (IT); Cinzia Chiappe, Pisa (IT); Bartolo Gabriele, Arcavacata di Rende (IT); Raffaella Mancuso, Arcavacata di Rende (IT); Yujiro Itami, Rome (IT)

(73) Assignees: Consiglio Nazionale Delle Ricerche, Rome (IT); Universitá Di Pisa, Pisa (IT); Universitá Della Calabria, Arcavacata di Rende (IT)

(*) Notice: Subject to any disclaimer, the term of this patent is extended or adjusted under 35 U.S.C. 154(b) by 85 days.

(21) Appl. No.: 16/979,030
(22) PCT Filed: Mar. 8, 2019
(86) PCT No.: PCT/IT2019/050050
§ 371 (c)(1),
(2) Date: Sep. 8, 2020
(87) PCT Pub. No.: WO2019/171409
PCT Pub. Date: Sep. 12, 2019

(65) Prior Publication Data
US 2021/0053016 A1    Feb. 25, 2021

(30) Foreign Application Priority Data
Mar. 8, 2018   (IT) .................. 102018000003374

(51) Int. Cl.
B01D 53/22    (2006.01)
B01D 71/40    (2006.01)
(Continued)

(52) U.S. Cl.
CPC ......... B01D 71/40 (2013.01); B01D 67/0006 (2013.01); B01D 69/125 (2013.01);
(Continued)

(58) Field of Classification Search
CPC .............. B01D 71/82; B01D 2323/345; B01D 2257/504; B01D 2323/40; B01D 69/125;
(Continued)

(56) References Cited

U.S. PATENT DOCUMENTS

2008/0029735 A1* 2/2008 Gin ...................... C07D 233/64
                                                             252/299.61
2008/0311045 A1* 12/2008 Hardy .................. A61K 9/0009
                                                             514/777
(Continued)

FOREIGN PATENT DOCUMENTS

KR    10-20150011814 A    2/2015
WO      2007018425 A1    2/2007

OTHER PUBLICATIONS

Matthew G. Cowan et al: "Poly(ionic liquid)/Ionic Liquid Ion-Gels with High "Free" Ionic Liquid Content: Platform Membrane Materials for CO 2/Light Gas Separations" Accounts of Chemical Research., vol. 49, No. 4, Apr. 19, 2016, pp. 724-732.
(Continued)

Primary Examiner — Anthony R Shumate
(74) Attorney, Agent, or Firm — ArentFox Schiff LLP

(57) ABSTRACT

The invention relates to dense synthetic membranes made from polymerised phosphonium-based ionic liquids which were found to be particularly suitable for use in gas separation. The membranes are obtainable by copolymerization via UV-curing of a composition comprising a phosphonium-based ionic liquid monomer, a co-monomer, a cross-linker, a surfactant and a photo-initiator, the remainder of the polymerization mixture consisting of water.
The invention also relates to a process of manufacturing said membranes, resulting in solid, dense and mechanically stable membranes, and to the use of the membranes so
(Continued)

produced in the separation of gas mixtures, particularly gas mixtures containing carbon dioxide.

17 Claims, 3 Drawing Sheets

(51) Int. Cl.
  *B01D 67/00* (2006.01)
  *B01D 69/12* (2006.01)
  *B01D 71/82* (2006.01)
(52) U.S. Cl.
  CPC ........ *B01D 71/82* (2013.01); *B01D 2257/102* (2013.01); *B01D 2257/104* (2013.01); *B01D 2257/108* (2013.01); *B01D 2257/504* (2013.01); *B01D 2257/7025* (2013.01); *B01D 2323/30* (2013.01); *B01D 2323/345* (2013.01); *B01D 2323/40* (2013.01)
(58) Field of Classification Search
  CPC ................ B01D 71/40; B01D 2323/30; B01D 2257/7025; B01D 67/0006; B01D 2257/104; B01D 2257/108; B01D 2257/102
  See application file for complete search history.

(56) References Cited

U.S. PATENT DOCUMENTS

| 2009/0173693 | A1* | 7/2009 | Gin | ........................ | B01D 69/10 |
| | | | | | 210/490 |
| 2012/0160095 | A1* | 6/2012 | Gin | ...................... | B01D 69/148 |
| | | | | | 427/245 |
| 2012/0186446 | A1 | 7/2012 | Bara et al. | | |
| 2012/0211424 | A1* | 8/2012 | Gabriel | .............. | B01D 67/0006 |
| | | | | | 427/244 |
| 2014/0060324 | A1* | 3/2014 | Ahn | ........................ | B01D 71/70 |
| | | | | | 96/10 |
| 2014/0134503 | A1* | 5/2014 | Lockett | ................... | H01G 11/36 |
| | | | | | 252/182.1 |
| 2014/0150287 | A1* | 6/2014 | Ahn | ...................... | B01D 53/268 |
| | | | | | 34/474 |
| 2014/0154499 | A1* | 6/2014 | Gin | ........................... | C08J 5/00 |
| | | | | | 427/517 |
| 2015/0287978 | A1* | 10/2015 | Lockett | .................... | C09D 5/00 |
| | | | | | 252/502 |
| 2015/0321149 | A1* | 11/2015 | McGinnis | ........... | B01D 67/009 |
| | | | | | 156/324 |
| 2018/0208728 | A1* | 7/2018 | Gin | ......................... | C08J 5/2231 |
| 2018/0212253 | A1* | 7/2018 | Lockett | ................. | H01M 4/483 |

OTHER PUBLICATIONS

Ansaloni Luca et al: "Influence of water vapor on the gas permeability of polymerized ionic liquids membranes", Journal of Membrane Science, Elsevier BV, NL, vol. 487, Apr. 1, 2015, pp. 199-208.
Shaojuan Zeng et al: "Ionic-Liquid-Based CO 2 Capture Systems: Structure, Interaction and Process", Chemical Reviews, vol. 117, No. 14, Jul. 26, 2017, pp. 9625-9673.
Matthew G. Cowan et al: "Phosphonium-based poly(Ionic liquid) membranes: The effect of cation alkyl chain lenght on light gas separation properties and Ionic conductivity", Journal of Membrane Science, Vo. 498, Jan. 1, 2016, pp. 408-413.
International Search Report and Written Opinion issued in International Application No. PCT/IT2019/050050 dated Jul. 11, 2019.
Korean action dated Jul. 4, 2022, (and English language translation attached) Application No. 10-2020-7028778.

* cited by examiner

MEMBRANES CONTAINING POLYMERIZED IONIC LIQUID FOR USE IN GAS SEPARATION

This application is a 35 U.S.C.§ 371 National Phase of PCT Application No. PCT/IT2019/050050, filed Mar. 8, 2019, which claims priority to Italian Patent Application No. 102018000003374, filed Mar. 8, 2018, the disclosures of which are hereby incorporated by reference herein in their entireties.

DESCRIPTION

Field of the Invention

The present invention relates to membranes containing polymerised ionic liquids for use in gas separation, as well as to a process for their production. More specifically, the invention relates to innovative synthetic membranes made from polymerised phosphonium-based ionic liquids which were found to be particularly suitable for use in gas separation. The invention also relates to the use of such membranes in the separation of gas mixtures, particularly gas mixtures containing carbon dioxide, and to a process of manufacturing said membranes, resulting in solid, dense and mechanically stable membranes.

Background of the Invention

The use of synthetic membranes to separate gas mixtures is well known in the art. The known separation processes are based on differences in the relative permeability of two or more gases through a membrane, which acts as a permeable barrier through which different compounds move across at different rates, or do not move at all. Typically, a mixture of gases is brought into contact with one side of a membrane, through which at least one of the gases permeates faster than the others. In this way a gas stream is separated into two streams, one of which is enriched in the selectively permeating gas(es).

Polymeric membranes are economical and technologically useful for the separation of gas mixtures, but their performance is limited by the so-called Robeson limit, to the effect that permeability must be sacrificed for selectivity and vice versa (Lloyd M. Robeson, Correlation of separation factor versus permeability for polymeric membranes, *J. Mem. Sci.* 62, 1991, 165-185). This limit affects, in particular, polymeric membrane use for $CO_2$ separation from flue gas streams, which recently became a critical issue in view of the need to preserve the earth from global warming. Indeed, the increased $CO_2$ concentration in the atmosphere due to emissions from fossil fuel combustion is presently one of the major environmental concerns.

Recently, $CO_2$ capture and sequestration are receiving significant attention. For carbon dioxide sequestration it is important to develop new materials and methods to separate and capture $CO_2$ from flue gas and other gas mixtures.

Ionic liquids, which are salts that become liquid usually below about 100° C. (such as, e.g., ethylammonium nitrate, $(C_2H_5)NH_3^+ \cdot NO_3^-$) have attracted attention because of their unique chemical and physical properties, such as their solvent properties and their electrical conductivity, which involve wide application potentials. These substances, also referred to as liquid electrolytes, fused salts or ionic glasses, have also been explored as non-volatile, and reversible, absorbents for $CO_2$ separation, in view of the fact that carbon dioxide was found to be remarkably soluble in ionic liquids.

In particular, for instance, the solubility of different liquid species in imidazolium ionic liquids depends mainly on polarity and hydrogen bonding ability of the species concerned. Gas solubility follows the same trend, with carbon dioxide gas showing exceptional solubility in many ionic liquids. Carbon monoxide is less soluble in ionic liquids than in many popular organic solvents, and hydrogen is only slightly soluble (similar to its solubility in water). It is also known that the solubility of carbon dioxide in ionic liquids is governed primarily by the anion, less so by the cation, and that the hexafluorophosphate ($PF_6^-$) and tetrafluoroborate ($BF_4^-$) anions have been shown to be especially suitable for $CO_2$ capture (Mahinder Ramdin et al., State-of-the-Art of $CO_2$ Capture with Ionic Liquids, *Ind. Eng. Chem. Res.* 51, 2012, 8149-8177).

The term poly(ionic liquid)s (PILs), or also polymerized or polymeric ionic liquids, refers to polymeric compounds that have a ionic liquid (IL) species in each monomer repeating unit, connecting through a polymeric backbone, which are obtained by polymerization of ILs having polymerizable groups. Some of these materials have been found to have a $CO_2$ absorption rate or a $CO_2$ absorption capacity remarkably higher than that of the corresponding ionic liquid monomer.

With reference to poly(ionic liquid)s and to their use for $CO_2$ separation, Bara et al. describe several gas membranes prepared from imidazolium-based IL monomers with n-alkyl substituents of varying length having improved $CO_2$ selectivity (J. E. Bara et al. Synthesis and performance of polymerizable room-temperature ionic liquids as gas separation membranes, *Ind. Eng. Chem. Res.* 46 (16) 2007, 5397-5404). The reference also reports that the selectivity of said membranes drops for the separation $CO_2/CH_4$ when the n-alkyl chain increases in density.

The U.S. Pat. No. 8,449,652 (Radosz et al., assignee University of Wyoming) and the co-owned patent application US2013/02255401 (Shen et al.) describe solid sorbents for the separation of carbon dioxide from a stream of mixed gases, which sorbents consist of polymerized ionic liquids where the ILs are selected from a) specific imidazolium-based ILs; b) specific ammonium-based ILs; c) specific phosphonium-based ILs; d) specific pyridinium-based ILs; and e) specific ionic monomers for condensation polymerization. These documents also disclose specific radical and condensation polymerization approaches for the preparation of said poly(ionic liquids). However, said polymers were reported to be too brittle to be mechanically stable. As far as the phosphonium-based ILs are concerned, the above US documents describe poly(ionic liquid)s prepared from the following monomers: (p-vinylbenzyl)triethylphosphonium tetrafluoroborate ([VBTEP][BF$_4$]) and (p-vinylbenzyl)triphenylphosphonium tetrafluoroborate ([VBTPP][BF$_4$]). An example of the structure of polymers resulting from the phosphonium-based ILs is as follows:

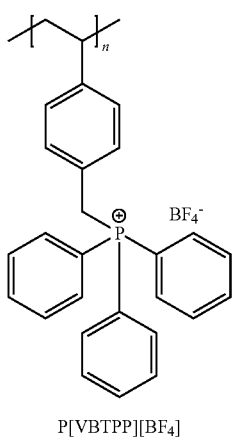

P[VBTPP][BF4]

In the case of poly([VBTEP][BF4]), the three phenyl groups above are replaced by three ethyl groups.

With reference to phosphonium-based poly(ionic liquids), Matthew G. Cowan et al. reported studies on poly(ionic liquids) based on phosphonium as alternatives to more common ammonium and imidazolium PILs. Specifically, the single-gas permeability, diffusivity, solubility and selectivity of free-standing films of poly([(tri-n-alkyl)vinylbenzylphosphonium][bis(trifluoromethylsulfonyl)imide]) having the following formula

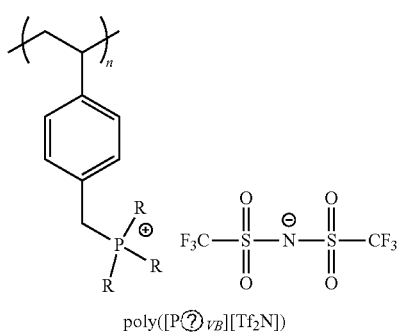

poly([P②$_{VB}$][Tf$_2$N])

where R=butyl, hexyl or octyl, obtained by free radical polymerization of the corresponding phosphonium monomers were investigated (M. J. Cowan et al., Phosphonium-based poly(ionic liquid) membranes: The effect of cation alkyl chain length on light gas separation properties and ionic conductivity, *J. Membr. Sci.* 498 (2016), 408-413). The authors report that gas permeability of the concerned membranes was found to increase with increasing alkyl chain length on the phosphonium group and that, in contrast, the gas selectivity of said films was observed to decrease with an increase in phosphonium alkyl chain length.

According to the above reference, free-standing membranes prepared from the mentioned phosphonium-based PILs were found to be substantially more permeable to light gases and generally less selective than the corresponding imidazolium-based PILs. The high $CO_2$ permeability of these membranes was regarded as potentially making phosphonium-based materials attractive candidates for developing economically viable, high-throughput membranes for $CO_2/N_2$ separation.

In spite of their qualification as potentially attractive, the membranes made from the phosphonium-based PILs of the prior art are not suitable as such for a commercial use, in view of the fact that a polymer of the only p-vinylbenzyl monomer bearing the tri(hydrocarbyl phosphonium) groups of formula (1) or (2) would be too expensive and too brittle to be commercially applicable.

SUMMARY OF THE INVENTION

On the basis of the prior art described above, the present invention is aimed at providing membranes produced from polymerized room-temperature ionic liquids (RTILs), specifically phosphonium-based ionic liquids, which are easy to manufacture, not too expensive from the point of view of the starting materials and mechanically stable, i.e. not too brittle.

According to the invention, it has been found that mixtures of RTILs having pendant tri(hydrocarbyl phosphonium) groups and polymerizable groups with suitably selected co-monomers, in combination with suitable amounts of a cross-linking agent (or cross-linker), can be converted by polymerization into solid, dense and mechanically stable membranes with improved properties for use in gas separation.

Thus, it has been shown, according to the invention, that if the trialkylphosphonium-based IL monomer and the cross-linker are present outside a certain range of concentrations, the resulting membranes do not show the required properties, in that too much IL monomer makes the end product too brittle (besides negatively affecting the costs) and the permeance high, as acknowledged by the prior art (M. J. Cowan et al., cited above). On the other hand, a too small amount of IL monomer does not result in good selectivity of the final membrane.

It has also been found that, contrary to the findings reported by the said prior art, the membranes produced according to the teachings of the present invention show increased selectivity as the length of the pendant alkyl chains of the phosphonium group increases from propyl to dodecyl.

According to a first aspect thereof, the present invention concerns a dense membrane obtainable by copolymerization via UV-curing of a composition comprising a phosphonium-based ionic liquid monomer, a co-monomer, a cross-linker and a surfactant.

The phosphonium-based ionic liquid monomer is a trialkyl[(4-vinylphenyl)alkyl]phosphonium ion with X$^-$ as counterion ([TAVPAP]X), as shown in Formula 1,

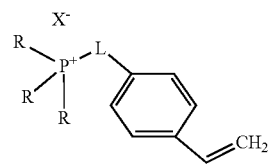

wherein each R represents an alkyl chain having 3 or more carbon atoms, L represents a linker consisting of a simple alkanediyl chain ($C_1$ or higher), or an ethereal chain containing carbon and oxygen atoms ($C_1$ or higher, with 1 or more oxygen atoms), and X$^-$ represents $BF_4^-$, $PF_6^-$, $SbF_6^-$, TsO$^-$, $CF_3$—$SO_3^-$, NC—N$^-$—CN, $(MeO)_2PO_2^-$, $EtSO_4^-$ or $F_3CO_2SN^-$—$SO_2CF_3$.

Suitable co-monomers which may be used for producing the membranes of the invention contain at least one ethylenically unsaturated group, such as, for instance, acrylates. According to the invention, co-monomers should be present in the polymer composition in an amount ranging from 30 to 70% by weight, while the IL monomer should be present in the mixture in an amount ranging from 10 to 50% by weight.

In order to be able to crosslink the IL monomer and the co-monomer, the crosslinking agent will of course have two or more ethylenically unsaturated groups. Therefore, e.g., when the crosslinking agent has only one acrylamide group it must have one or more ethylenically unsaturated groups other than an acrylamide group, such as an acrylate group. The concentration of cross-linker in the mixture can range from 0.5 to 20% by weight.

In order to be curable by UV or visible light radiation, the polymerization mixture according to the first aspect of the present invention shall contain a suitable amount of a photo-initiator. Suitable photo-initiators are those known in the art, such as radical type, cation type or anion type photo-initiators. For acrylates, diacrylates, and higher-acrylates, type I photo-initiators are preferred.

In addition, a surfactant or a combination of surfactants may be included in the curable polymer mixture according to the invention, e.g. as a wetting agent and/or to adjust surface tension of the mixture.

It should be noted that the membranes of this invention do not require the use of solvents like DMF or DMA which are normally applied for the solubilisation of the ILs, neither the use of volatile solvents for the preparation of dense membranes by evaporation induced phase technique (EIPS). In the present invention the PILs are dispersed by means of a surfactant into a polymerizable matrix and polymerized by means of UV radiation.

The poly(RTIL) membranes obtained according to the invention can be further mechanically strengthened by addition of a porous support, and via photo-polymerisation these can be prepared to dense films of any size and thickness.

According to a second aspect thereof, the present invention concerns a process for producing dense poly(ionic liquid) membranes with unique selectivity and flux properties, which process includes the following steps:
  providing a mixture of at least one type of IL curable monomer, at least one type of co-monomer, at least one surfactant and a cross-linker, said components being selected as described above, wherein the concentration of said curable IL monomer is effective to obtain a membrane with suitable gas separation where the thickness of the membrane ranges between 0.02 and 200 µm;
  applying said mixture to a support by a film casting knife or between two glass or quartz plates;
  curing said curable monomer mixture by UV radiation to induce polymerization.

The dense poly(ionic liquid) membranes produced according to the into have unique selectivity and flux properties, especially for separating $CO_2$ from gas mixtures containing it.

According to a third aspect thereof, the present invention concerns the use for gas separation of a dense membrane obtainable by copolymerization via UV-curing of a composition comprising a phosphonium-based ionic liquid monomer, one or more co-monomers, a cross-linker and one or more surfactants.

According to a fourth aspect thereof, finally, the invention concerns a process for separating two components of a gas mixture, which process uses a gas separation membrane having a selective layer consisting of a poly(RTIL) membrane produced as set forth above.

DETAILED DESCRIPTION OF THE INVENTION

Therefore, the present invention specifically provides a dense membrane obtainable by copolymerization via UV-curing of a mixture comprising:
  a) 10 to 50 wt %, preferably 20-30 wt %, of a IL monomer trialkyl[(4-vinylphenyl)alkyl]phosphonium with $X^-$ as counterion ([TAVPAP]X) of the following formula:

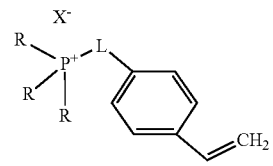

wherein each R represents an alkyl chain having 3 to 20 carbon atoms, L represents a linker consisting of a simple alkanediyl $C_1$-$C_{20}$ chain, or an ethereal chain containing 1-20 carbon atoms and 1-10 oxygen atoms, and $X^-$ represents an anion selected from the group consisting of: $BF_4^-$, $PF_6^-$, $SbF_6^-$, $TsO^-$, $CF_3$—$SO_3^-$, NC—$N^-$—CN, $(MeO)_2PO_2^-$, $EtSO_4^-$ or $F_3CO_2SN^-$—$SO_2CF_3^-$;
  b) 30 to 70% wt %, preferably 50-60 wt % of one or more ethylenically unsaturated co-monomers, preferably acrylates;
  c) 1 to 35 wt %, preferably 10-30 wt %, of a surfactant;
  d) 0.5-20% wt %, preferably 2-10 wt %, of one or more cross-linkers,
  e) 0.001 to 5 wt %, preferably 0.1 to 1 wt %, of a photo-initiator;
  f) the remainder of the mixture being water.

According to some specific embodiments of the invention, each R of the IL monomer represents, preferably, an alkyl chain having 3 to 10 carbon atoms and, more preferably, it represents butyl, hexyl or octyl.

According to some further specific embodiments of the invention, the linker L is an alkanediyl $C_1$-$C_{10}$, more preferably it is an alkanediyl $C_1$-$C_4$ and most preferably it represents a methanediyl group.

As mentioned above, examples of ethylenically unsaturated compounds to be used as co-monomers are acrylates, and the preferred ones are 2-hydroxyethyl acrylate (HEMA), polyethylene glycol monoacrylate, hydroxypropyl acrylate, polypropylene glycol monoacrylate, 2-methoxyethyl acrylate, 2-phenoxyethyl acrylate and combinations of two or more of the same. According to some specific embodiments of the invention, the ethylenically unsaturated co-monomer is 2-hydroxyethyl acrylate (HEMA), and, more preferably it is present in the composition in the amount of 50-60 wt %.

Suitable cross-linkers for the purpose of this invention are molecules bearing two polymerisable ends, such as isophorone diacrylamide, N,N'-(1,2-dihydroxyethylene) bis-acrylamide, N,N-methylene-bis-acrylamide, 1,3,5-triacryloylhexahydro-1,3,5-triazine, 2,4,6-triallyloxy-1,3,5-triazine, N,N'-ethylenebis(acrylamide), bis(aminopropyl) methylamine diacrylamide, and especially 1,4-diacryoyl piperazine and 1,4-bis(acryloyl)homopiperazine and ethylene glycol dimethacrylate (EGDMA), as well as combinations of two or more of the same.

Curable compositions containing cross-linking agent(s) can sometimes be rather rigid, and in some cases this can adversely affect the mechanical properties of the resulting membrane. However, too much of ethylenically unsaturated compounds having only one ethylenically unsaturated group can lead to membranes with a very loose structure. Also, the efficiency of the curing can be reduced when large amounts of curable compound(s) having only one ethylenically unsaturated group are used, increasing the time taken to complete curing and potentially requiring inconvenient conditions.

Bearing these factors in mind, the composition according to the invention preferably comprises 1 to 15 wt %, more preferably 2 to 10 wt % of cross-linking agent.

Examples of type I photo-initiators are those described in the international patent application publ. No. WO 2007/018425 (Fuji Photo Film B.V.), from page 14, line 23 to page 15, line 26. Especially preferred photoinitiators include α-hydroxyalkylphenones (e.g. 2-hydroxy-2-methyl-1-phenylpropan-1-one, 2-hydroxy-2-methyl-1-(4-tert-butyl)phenylpropan-1-one, 2-hydroxy-[4'-(2-hydroxypropoxy)phenyl]-2-methylpropan-1-one, 2-hydroxy-1-[4-(2-hydroxyethoxy)phenyl]-2-methylpropan-1-one, 1-hydroxycyclohexylphenylketone and oligo[2-hydroxy-2-methyl-1-{4-(1-methylvinyl)phenyl}propanone]), α-aminoalkylphenones (e.g. 2-benzyl-2-(dimethylamino)-4'-morpholino-butyrophenone and 2-methyl-4'-(methylthio)-2-morpholinopropiophenone, α-sulfonylalkylphenones), acetophenones (e.g. 2,2-dimethoxy-2-phenylacetophenone), and acylphosphine oxides (e.g. 2,4,6-trimethylbenzoyldiphenylphosphine oxide, bis(2,6-dimethoxybenzoyl)-2,4,4 trimethyl-pentylphosphineoxide, ethyl-2,4,6-trimethylbenzoylphenylphosphinate and bis(2,4,6-trimethylbenzoyl)phenylphosphine oxide), azobisisobutyronitrile (AIBN) or peroxides like dibenzoyl peroxide.

Commercially available surfactants may be utilized for the manufacture of the membranes, including radiation-curable surfactants. Surfactants suitable for use in the composition include non-ionic surfactants, ionic surfactants, amphoteric surfactants and combinations thereof. Preferred surfactants are as described for instance in the international patent application publ No. WO 2007/018425 cited above, specifically from page 20, line 15 to page 22, line 6. Fluorosurfactants are particularly preferred, especially Zonyl® FSN and Capstone® fluorosurfactants (produced by E.I. Du Pont). Also preferred are polysiloxane-based surfactants, especially Surfynol from Air Products, Xiameter surfactants from DowCorning, TegoPren and TegoGlide surfactants from Evonik, Siltech and Silsurf surfactants from Siltech, and Maxx organosilicone surfactant from Sumitomo Chemical. Most preferred are ionic surfactants such as long-alkyl chained ($C_8$-$C_{22}$) trimethyl ammonium salts.

According to some further specific embodiments of this invention, the IL monomer is present in the mixture undergoing polymerisation at a concentration of 20-30 wt %, the surfactant is present at a concentration of 10-30 wt %, the cross-linker is present at a concentration of 1-10 wt % and the photo-initiator is present at a concentration of 0.1 to 1 wt %.

Most remarkably, as noted in the foregoing, the composition which is used for producing the membranes of the invention does not comprise organic solvents as DMF or DMA, which were used by prior art references. The remainder of the composition, when desired, is water.

As per the second aspect of the invention, a process for producing dense poly(ionic liquid) membranes suitable for gas separation is concerned, which process includes the following steps:
  providing a mixture as defined under items a) to f) mentioned above;
  applying said mixture to a support by means of a film casting knife or casting said mixture between two plates so that the thickness of the membrane ranges between 0.02 and 200 µm, and
  curing said curable monomer mixture by UV radiation to induce polymerization.

According to the third aspect thereof, the present invention concerns the use of a poly(ionic liquid)-based membrane as defined herein, or produced according to the process disclosed herein, for gas separation. Specifically, the membranes according to the invention may be used for separating gases which include carbon dioxide ($CO_2$), hydrogen ($H_2$), methane ($CH_4$), nitrogen ($N_2$) and oxygen ($C_2$). It should be noted that, opposite to the work of Cowan (cited above), the experimentation carried out in the frame of the present invention did not show an increase in permeance of the membrane when the pendant alkyl moieties go from ethyl to octyl, rather it showed a tremendous reduction in permeance and therefore an increase in $CO_2$/$CH_4$, $CO_2$/$N_2$ and $CO_2$/$H_2$ selectivity.

According to the fourth aspect thereof, the invention concerns a process for separating two components, A and B, of a gas mixture, using the poly(ionic liquid)-based membranes, which process comprises:
  (i) passing said gas mixture across a separation membrane having a feed side and a permeate side, said separation membrane having a selective layer produced as defined in the foregoing;
  (ii) providing a driving force for transmembrane permeation;
  (iii) withdrawing from the permeate side a permeate stream enriched in component A compared to the gas mixture; and
  (iv) withdrawing from the feed side a residue stream depleted in component A compared to the gas mixture.

The above process is advantageously applied, according to some preferred embodiments of the invention, to the separation of carbon dioxide from other gases, such as nitrogen, hydrogen or methane.

BRIEF DESCRIPTION OF THE FIGURES

The specific features of the invention, as well as the advantages thereof, will become more apparent with reference to the exemplary and not limiting experimental work description reported in the following, and to the relative figures, in which.

EXAMPLES

Figure 1:
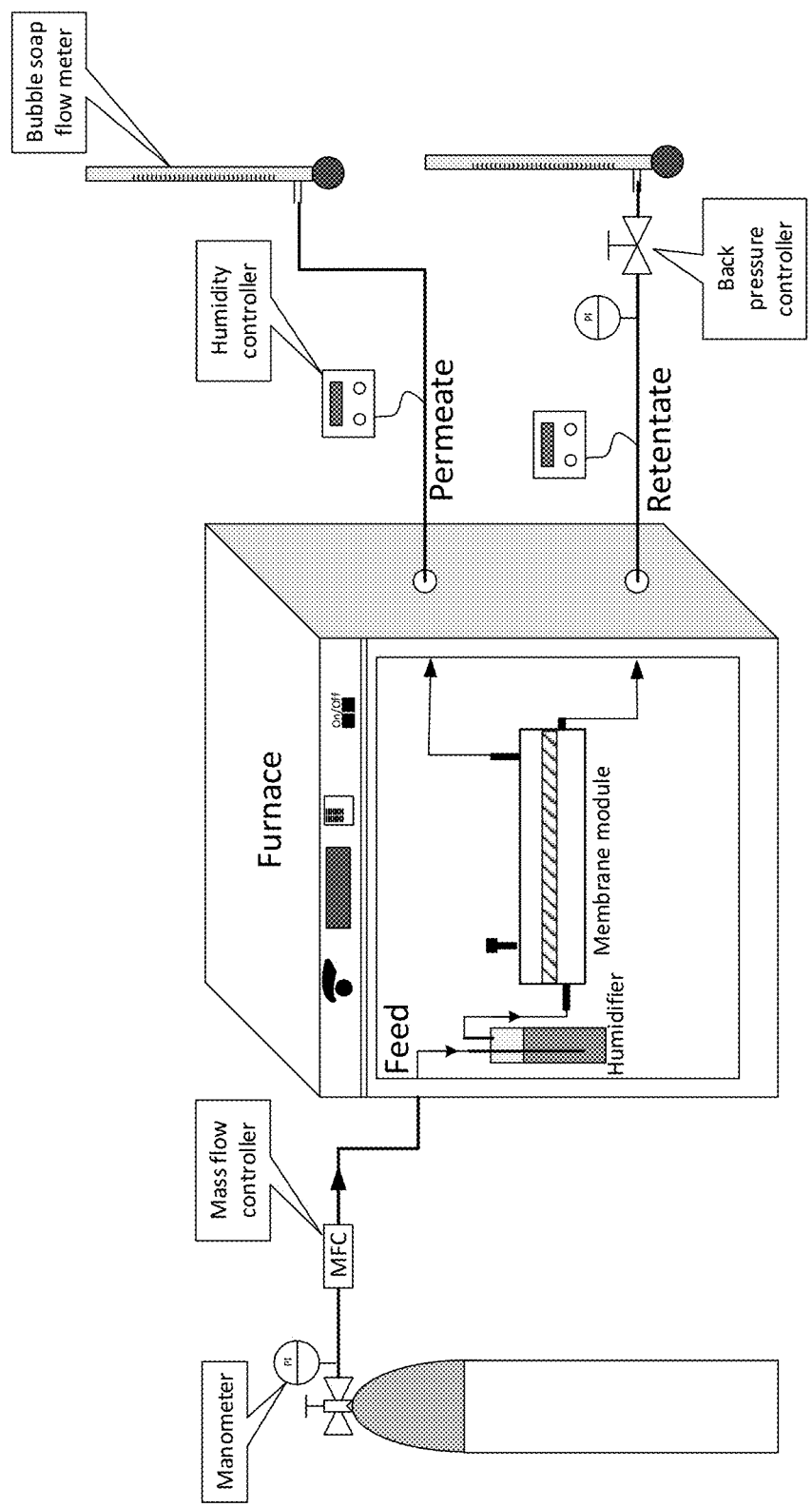
FIG. 1 schematically shows an experimental setup for the mixed gas permeation measurements to test the performance of the poly(RTIL) membranes of the present invention.

The following materials were used in the Examples:

Ionic liquid monomers were prepared according to literature (Barsanti, A. C. et al., *RSC Adv.* 2014, 4, 38848-38854).

The co-monomers (such as HEMA), the cross-linkers (such as EGDMA), the surfactants (such as docecyltrimethilammonium bromide, DTAB), the photoiniators (such as dimethoxyphenyl acetophenone, DMPA) were purchased from Sigma-Aldrich and used as received.

Each RTIL momomer (27 wt %) was mixed with 52 wt % of a co-monomer (2-hydroxyethyl methacrylate, HEMA), 13 wt % of a surfactant (dodecyltrimethylammonium bromide, DTAB) and 8 wt % water. Then, the cross-linker (ethylene glycol dimethacrylate, EGDMA; 3 wt % with respect to the amount of RTIL+HEMA) and a photoiniator (dimethoxyphenyl acetophenone, DMPA, 0.6 wt % with respect to the total weight of the mixture thus obtained) were added (see Table 1 for the compositions of CEx2 and invention examples Ex1 to Ex6).

All solutions were separately cast between two Rain-X coated quartz plates and photo-polymerised for 3 minutes under a 365 nm UV-lamp with an intensity of 8.5 mW/cm² at the sample surface (XX-15A, Spectroline, Westbury, N.Y.).

The polymerized membranes were removed in water from the glass plates and stored in water up to the gas tests.

TABLE 1

Composition of the tested membranes

| Membrane | Type of IL Concentration (wt %) | HEMA (co-monomer) (wt %) | $H_2O$ (wt %) | DTAB (surfactant) (wt %) | EGDMA (cross-linker) (wt %) | DMPA (photoinitiator) (wt %) | Thickness (μm) |
|---|---|---|---|---|---|---|---|
| CEx1 | — | 70 | 12.5 | 17.5 | 3 | 0.6 | 150 |
| CEx2 | triethyl(4-vinylbenzyl) phosphonium tetrafluoroborate 27 wt % | 52 | 8 | 13 | 3 | 0.6 | 200 |
| Ex1 | tributyl(4-vinylbenzyl) phosphonium tetrafluoroborate 27 wt % | 52 | 8 | 13 | 3 | 0.6 | 98 |
| Ex2 | tributyl(4-vinylbenzyl) phosphonium tetrafluoroborate 27 wt % | 52 | 8 | 13 | 3 | 0.6 | 51 |
| Ex3 | tributyl(4-vinylbenzyl)phosphonium tetrafluoroborate 27 wt %) | 52 | 8 | 13 | 3 | 0.6 | 69 |
| Ex4 | trioctyl(4-vinylbenzyl) phosphonium tetrafluoroborate (27 wt %) | 52 | 8 | 13 | 3 | 0.6 | 200 |
| Ex5 | trioctyl(4-vinylbenzyl) phosphonium tetrafluoroborate (27 wt %) | 52 | 8 | 13 | 3 | 0.6 | 110 |
| Ex6 | trioctyl(4-vinylbenzyl) phosphonium tetrafluoroborate (27 wt %) | 52 | 8 | 13 | 3 | 0.6 | 47 |

In the following examples all parts and percentages are by weight unless otherwise specified.

Examples and Comparative Examples

The blank solution (referred to in Table 1 as CEx1) was prepared by mixing 70 wt % of a co-monomer (2-hydroxyethyl methacrylate, HEMA), 17.5 wt % of a surfactant (dodecyltrimethylammonium bromide, DTAB) and 12.5 wt % water. Then, the crosslinker (ethylene glycol dimethacrylate, EGDMA; 3 wt % with respect to the amount of HEMA) and a photoiniator (dimethoxyphenyl acetophenone, DMPA, 0.6 wt % with respect to the total weight of the mixture thus obtained) were added.

In the frame of the research that led to the present invention some tests were performed adding methylmethacrylate (MMA) (at 10 and 13.5 wt %) as a second co-monomer in the system. The solution was co-polymerised within the membrane together with PILs. However, it was found that the presence of MMA caused a decrease in mechanical resistance of the resulting membrane.

Further, some membranes were prepared avoiding the use of the cross-linker EGDMA. However, when EGDMA was not present in the system, the polymerization was not complete and the resulting membrane was very fragile.

The amount of water was also varied (8, 20, 25, and 30 wt %). However when the concentration of water was increased to more than 8 wt % the membrane resulted porous, and its mechanical properties were drastically decreased.

The following Table 2 shows, by way of comparative examples, the compositions of some membranes outside the scope of the present invention, together with a short comment on their performances.

with a PID controller for controlling the temperature during the experiments. The four ends of the module were: feed, retentate, permeate, sweep. No sweep gas was applied in the present measures; therefore, this exit was kept closed during all the experiments.

TABLE 2

Composition of membranes outside the scope of this invention

| Membrane code | IL (wt %) | HEMA (co-monomer) (wt %) | MMA ($2^{nd}$ co-monomer) (wt %) | $H_2O$ (wt %) | DTAB (surfactant) (wt %) | EGDMA (cross-linker) (wt %) | DMPA (initiator) (wt %) | Comments |
|---|---|---|---|---|---|---|---|---|
| IL 21 | Trioctyl(4-vinylbenzyl)phosphonium bis(trifluoromethanesulfonamide) 17 wt % | 52 wt % | 10 wt % | 8 | 13 wt % | 3 wt % on the weight of IL + HEMA | 0.6 wt % | The membrane is fragile |
| IL 17 | Trioctyl(4-vinylbenzyl)phosphonium bis(trifluoromethanesulfonamide) 13.5 wt % | 52 wt % | 13.5 wt % | 8 | 13 wt % | 3 wt % on the weight of IL + HEMA | 0.6 wt % | The membrane is fragile |
| IL 37 | 1-Hexyl-3-(4-vinylbenzyl)-1H-3-imidazolium bis(trifluoromethanesulfonamide) 18.8 wt % | 18 wt % | — | 36.6 | 27.7 wt % | — | 0.6 wt % | The membrane is fragile |
| IL 43 | 1-Hexyl-3-(4-vinylbenzyl)-1H-3-imidazolium bis(trifluoromethanesulfonamide) 22 wt % | 29 wt % | — | 20 | 29 wt % | 5 wt % on the weight of IL + HEMA | 0.6 wt % | The membrane is fragile |
| IL 42 | 1-Hexyl-3-(4-vinylbenzyl)-1H-3-imidazolium bis(trifluoromethanesulfonamide) 21 wt % | 26 wt % | — | 25 | 28 wt %) | 5 wt % on the weight of IL + HEMA | 0.6 wt % | The membrane is permeable to water. It is porous |
| IL 41 | 1-Hexyl-3-(4-vinylbenzyl)-1H-3-imidazolium bis(trifluoromethanesulfonamide) 20 wt % | 23 wt % | — | 30 | 27 wt % | 5 wt % on the weight of IL + HEMA | 0.6 wt % | The membrane is fragile |

Evaluation of Gas Permeability and Selectivity

The transport properties of the membranes were investigated by feeding single gases, in saturated conditions (RH=99%) at a transmembrane pressure difference of 10 bar, and measuring the membrane properties such as permeance (flux) and ideal selectivity. Table 3 below reports the operating conditions adopted during the experiments.

TABLE 3

| Operating parameters | |
|---|---|
| Temperature | 25° C. |
| Feed pressure | 10 bar |
| Permeate pressure | 1 bar |
| Relative humidity, % | 99 |
| No sweep gas | |
| Feed composition | single gases: $CO_2$, $N_2$, $CH_4$, $H_2$ |

The experimental apparatus used for carrying out the gas permeation experiments is schematically shown in FIG. 1.

In the experiments reported herein, symmetric flat sheet membranes were mounted in a stainless steel membrane module opportunely dimensioned. The membrane module can host membranes from 1 mm² to 100 cm². In this specific case, the effective membrane area available for permeation was ranging between 3.8 and 19.2 cm².

Once the membranes were sealed in, the permeation module constituted by four ends was placed in a furnace The method used for permeation measurements was the concentration gradient method, consisting in forcing a part of the feed stream to permeate the membrane under a pressure gradient and measuring both the permeate and retentate flow rates. Mass transport properties were measured by single gas experiments. Each gas (contained in single cylinders with a purity 5.0) was fed to the membrane module with a mass flow controller (Brooks Instrument$^{AM}$, 5860S) positioned at the feed line to manipulate the feed flow rates. A back pressure regulator (Swagelok, KBP) and a pressure gauge on the retentate line were used to keep the required trans-membrane pressure difference in the module. The retentate and permeate flow rates were measured by two bubble flow meters.

To perform the experiments in wet conditions, a stainless steel humidifier was placed before the module inlet and was set at the same temperature and pressure of the membrane module. The dry feed gas was forced to enter the humidifier were ultrapure water was contained. Since this humidifier was set at the same temperature and pressure of the membrane module, after bubbling in the water, the gaseous stream exiting the humidifier and fed to the module was saturated, as confirmed by the humidity sensor placed before the module feed line.

In principle, this apparatus allows to modulate the relative humidity by mixing two streams of the same gas or mixture: the first stream saturated with water (relative humidity=100%) and the other stream completely dry. The value of relative humidity can be tuned by changing the flow rates of the two streams.

All the experimental measurements carried out on the membranes of the present invention were performed at 99% of relative humidity in the feed stream to assure the proper level of membrane hydration. Three humidity sensors measured the relative humidity of the feed, retentate and permeate.

The separation performance of the membrane was evaluated by the permeance and selectivity in the gas mixture. The permeance (Eq. 1) is the permeate flow rate normalized by the membrane area and the partial pressure differences through the membrane.

$$Permeance_i = \frac{\frac{\text{Permeate flow rate}}{\text{Membrane area}}}{\left[Pressure^{Feed}\left(\frac{x_i^{Feed}+x_i^{Retentate}}{2}\right) - Pressure^{Permeate}x_i^{Permeate}\right]}, GPU \quad (1)$$

where x is the molar fraction of gas i. (Units are in barrer, where 1 barrer=$10^{-10}$ cm$^3$ (STP) cm/cm$^2$ s cm Hg)

As in the case of the membranes of the present invention, the flat module and the high flow rates used allow the complete mixing in the feed side; therefore, no profiles exited between feed/retentate ends.

Permeability was used (Eq. 2) to compare membranes performance having different thicknesses.

$$Permeability_i = Permeance * \text{membrane thickness} \quad (2)$$

The selectivity (Eq. 3) is the ratio of the membrane permeance of two gases.

$$Selectivity_{ij} = \frac{Permeance_i}{Permeance_j} \quad (3)$$

Tables 4, 5 and 6 below shows the results of the permeability and selectivity tests on membranes having no RTIL monomer in the composition (CEx1), membranes having pendant $C_2$ alkyl chains (CEx2) and membranes according to the invention (butyl$_3$P$^+$vinylbenzene and octyl$_3$P$^+$vinylbenzene), respectively for the couples of gases $CO_2/N_2$, $CO_2/CH_4$ and $CO_2/H_2$. The same results are presented in graphic form in FIGS. 2, 3 and 4.

TABLE 4

| $CO_2/N_2$ selectivity vs. $CO_2$ permeability | | | | |
|---|---|---|---|---|
| | $CO_2$ permeability, barrer | Standard deviation | $CO_2/N_2$ selectivity | Standard deviation |
| CEx1 | 34.5 | n.a. | 2.5 | n.a. |
| CEx2 | 101.6 | n.a. | 4.1 | n.a. |

TABLE 4-continued

| $CO_2/N_2$ selectivity vs. $CO_2$ permeability | | | | |
|---|---|---|---|---|
| | $CO_2$ permeability, barrer | Standard deviation | $CO_2/N_2$ selectivity | Standard deviation |
| butyl$_3$P$^+$vinylbenzene | 37.9 | 4.15 | 6.0 | 0.00 |
| octyl$_3$P$^+$vinylbenzene | 33.6 | 7.88 | 29.9 | 2.54 |

TABLE 5

| $CO_2/N_2$ selectivity vs. $CO_2$ permeability | | | | |
|---|---|---|---|---|
| | $CO_2$ permeability, barrer | Standard deviation | $CO_2/CH_4$ selectivity | Standard deviation |
| CEx1 | 34.5 | n.a. | 4.1 | n.a. |
| CEx2 | 101.6 | n.a. | 3.4 | n.a. |
| butyl$_3$P$^+$vinylbenzene | 37.9 | 4.15 | 7.8 | 0.00 |
| octyl$_3$P$^+$vinylbenzene | 33.6 | 7.88 | 31.4 | 3.15 |

TABLE 6

| $CO_2/N_2$ selectivity vs. $CO_2$ permeability | | | | |
|---|---|---|---|---|
| | $CO_2$ permeability, barrer | Standard deviation | $CO_2/H_2$ selectivity | Standard deviation |
| CEx1 | 34.5 | n.a. | 1.8 | n.a. |
| CEx2 | 101.6 | n.a. | 1.04 | n.a. |
| butyl$_3$P$^+$vinylbenzene | 37.9 | 4.15 | 11.2 | 0.00 |
| octyl$_3$P$^+$vinylbenzene | 33.6 | 7.88 | 17.3 | 2.54 |

Figure 2:
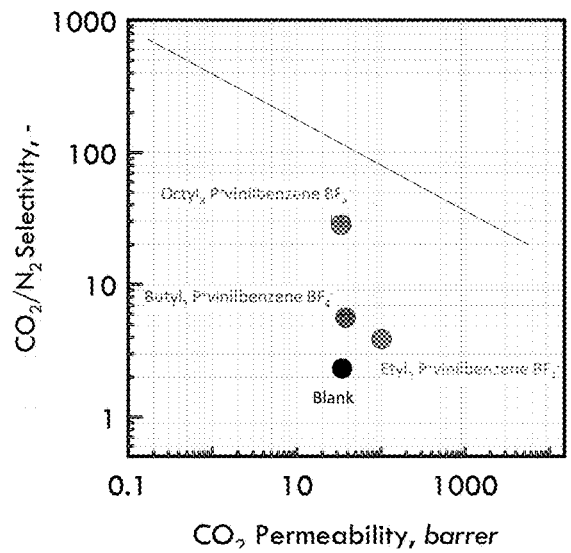
FIG. 2 shows the $CO_2$/$N_2$ selectivity vs. permeability plot for membranes with RTIL monomers having pendant $C_4$ and $C_8$ alkyl chains according to the invention, in comparison with membranes having no RTIL monomer in the composition (referred to as CEx1) and membranes having pendant $C_2$ alkyl chains (CEx2)
Figure 3:
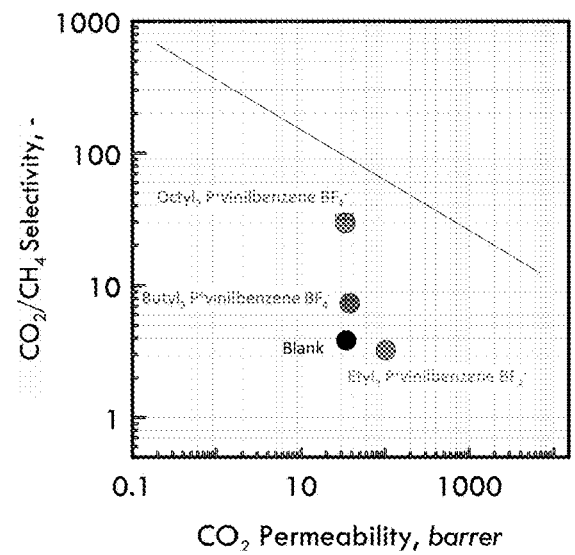
FIG. 3 shows the $CO_2$/$CH_4$ selectivity vs. permeability plot for membranes of the same types of FIG. 2.
Figure 4:
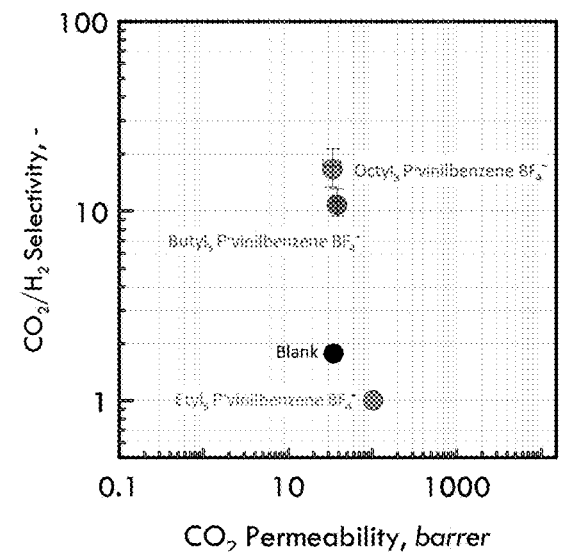
FIG. 4 shows the $CO_2$/$H_2$ selectivity vs. permeability plot for membranes of the same types of FIG. 2.

FIGS. 2, 3 and 4 clearly show the improvement found (particularly in terms of selectivity) for the membranes of the compositions of Examples 1 to 6 according to to the invention against CEx1 (blank without the IL monomer) and CEx2 having an ethyl-chain connected to the phosphonium group.

All the results have been normalized in terms of permeability, meaning to that the thickness has been already taken into account in the graphics. The thickness was measured just before experimental measurements on the membrane completely wet, since it is not possible to measure the thickness on the dry sample.

Table 7 below shows the permeability of the membranes in this study to the various gases, and the results of selectivity tests for the various couples of gases.

TABLE 7

| Permeability and selectivity as a function of alkyl chain length | | | | | | | |
|---|---|---|---|---|---|---|---|
| | $CO_2$ permeability, barrer | $N_2$ permeability, barrer | $CH_4$ permeability, barrer | $H_2$ permeability, barrer | $CO_2/N_2$ selectivity | $CO_2/CH_4$ selectivity | $CO_2/H_2$ selectivity |
| CEx1 | 34.5 | 14.0 | 8.4 | 18.7 | 2.5 | 4.1 | 1.8 |
| CEx2 | 101.6 | 24.7 | 29.5 | 97.3 | 4.1 | 3.4 | 1.04 |

TABLE 7-continued

Permeability and selectivity as a function of alkyl chain length

| | $CO_2$ permeability, barrer | $N_2$ permeability, barrer | $CH_4$ permeability, barrer | $H_2$ permeability, barrer | $CO_2/N_2$ selectivity | $CO_2/CH_4$ selectivity | $CO_2/H_2$ selectivity |
|---|---|---|---|---|---|---|---|
| butyl$_3$P$^+$ vinylbenzene | 37.9 ± 4.15 | 6.5 | 5.0 | 3.5 ± 0.95 | 6.0 ± 0.00 | 7.8 ± 0.00 | 11.2 ± 0.00 |
| octyl$_3$P$^+$ vinylbenzene | 33.6 ± 7.88 | 1.1 | 1.1 | 1.9 ± 0.20 | 29.9 ± 2.54 | 31.4 ± 3.15 | 17.3 ± 3.95 |

Figure 5:
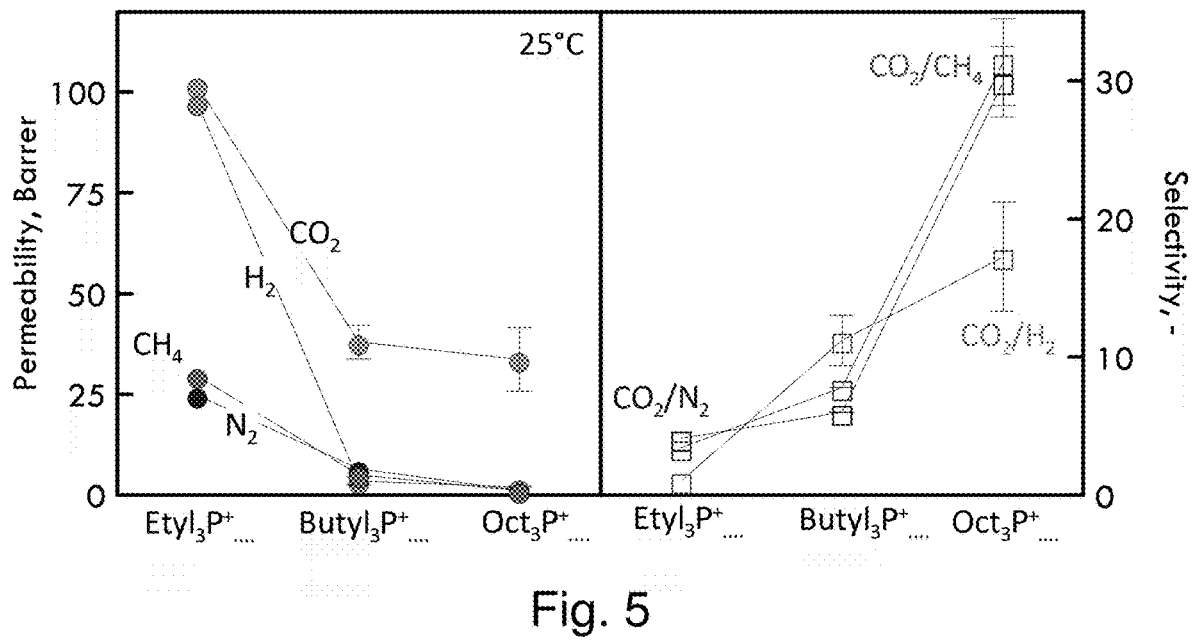
FIG. 5 is a graph showing the permeability (left) and the selectivity (right) to various gases of membranes with RTIL monomers having pendant $C_4$ and $C_8$ alkyls according to the invention, or having pendant $C_2$ alkyls according to the prior art, as a function of chain length.

The same results of the table above are presented in graphic form in FIG. 5, where the permeability of the various gases (left) and the selectivity of the membranes for various couples of gases (right) are plotted as a function of the pendant alkyl chains length. As it can be seen in FIG. 5, the permeability of all the investigated gases decreases as longer is the ionic liquid chain length.

The triethyl(4-vinylbenzyl)phosphonium tetrafluoroborate has thus the highest permeability which is more than three times greater than the one of trioctyl(4-vinylbenzyl)phosphonium tetrafluoroborate.

The functionality of selectivity with ionic liquid chain length follows a positive trend, therefore the trioctyl(4-vinylbenzyl)phosphonium tetrafluoroborate shows the highest selectivity with respect to the other membranes prepared with a shorter ionic liquid chain length. The membranes result to be selective toward $CO_2$, and this can be mainly ascribed to the presence of ionic liquids which promote the solubility of $CO_2$, preferentially favouring its permeability, with respect to the other gases for which the transport is mainly influenced by diffusivity.

Figure 6:
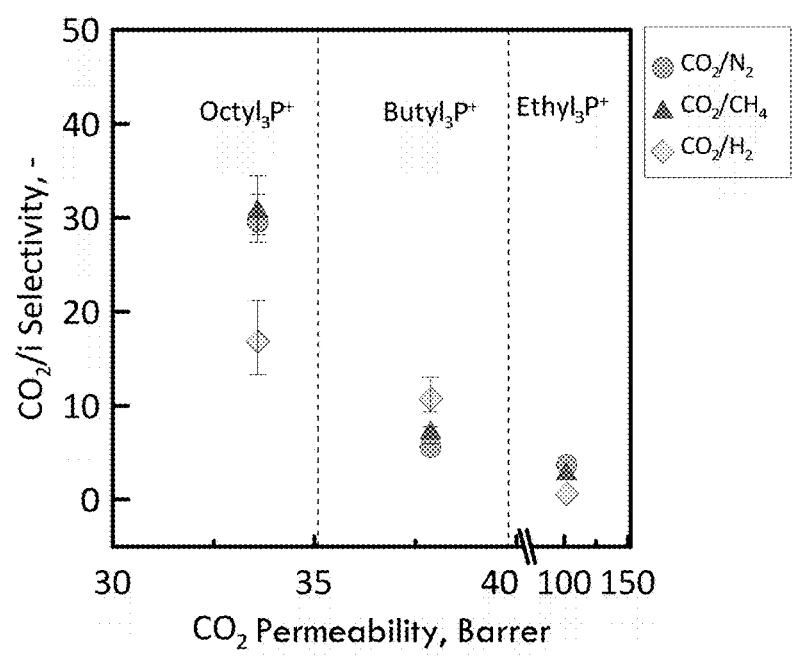
FIG. 6 is a graph showing the selectivity vs. permeability plot for the various couples of gases tested, for the same membranes of FIG. 5.

From the data of Table 7 above it is also possible to draw the graph of FIG. 6, where the $CO_2/N_2$, $CO_2/CH_4$ and $CO_2/H_2$ selectivities are reported vs. the $CO_2$ permeability for the membranes examined. Basically, as shown in this figure, a sort of trade-off between permeability and selectivity was observed, as function of the chain length: the higher the permeability the lower the selectivity and vice versa.

The present invention has been described with reference to a few specific embodiments, but it is to be understood that variations and modifications may be made by those skilled in the art without departing from the scope of the invention as is clear from the appended claims.

The invention claimed is:

1. A dense poly(ionic liquid)-based membrane suitable for gas separation obtainable by copolymerization via UV-curing of a mixture comprising:
   a) 10 to 50 wt %, of a IL monomer trialkyl[(4-vinylphenyl)alkyl]phosphonium with X$^-$ as counterion ([TAV-PAP]X) of the following formula:

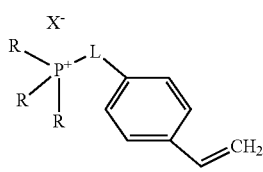

wherein each R represents an alkyl chain having 3 to 20 carbon atoms, L represents a linker consisting of a simple alkanediyl $C_1$-$C_{20}$ chain, or an ethereal chain containing 1-20 carbon atoms and 1-10 oxygen atoms, and X$^-$ represents an anion selected from the group consisting of: $BF_4^-$, $PF_6^-$, $SbF_6^-$, $TsO^-$, $CF_3$—$SO_3^-$, NC—N$^-$—CN, $(MeO)_2PO_2^-$, $EtSO_4^-$ or $F_3CO_2SN^-$—$SO_2CF_3$
   b) 30 to 70 wt % of one or more ethylenically unsaturated co-monomers;
   c) 1 to 35 wt % of a surfactant;
   d) 0.5-20% wt %, of one or more cross-linkers,
   e) 0.001 to 5 wt % of a photo-initiator;
   f) the remainder of the mixture being water.

2. The dense poly(ionic liquid)-based membrane according to claim 1, wherein each R represents an alkyl chain having 3 to 10 carbon atoms.

3. The dense poly(ionic liquid)-based membrane according to claim 2, wherein each R represents butyl, hexyl or octyl.

4. The dense poly(ionic liquid)-based membrane according to claim 1, wherein L represents a methanediyl group.

5. The dense poly(ionic liquid)-based membrane according to claim 1, wherein the ethylenically unsaturated co-monomer is 2-hydroxyethyl acrylate (HEMA), and is present in the composition in the amount of 50-60 wt %.

6. The dense poly(ionic liquid)-based membrane according to claim 5, wherein the IL monomer is present in the composition at a concentration of 20-30 wt %, the surfactant is present at a concentration of 10-30 wt %, the cross-linker is present at a concentration of 1-10 wt % and the photo-initiator is present at a concentration of 0.1 to 1 wt %.

7. A process for producing dense poly(ionic liquid) membranes suitable for gas separation, which process includes the following steps:
   providing a mixture as defined under items a) to f) of claim 1;
   applying said mixture to a support by means of a film casting knife or casting said mixture between two plates so that the thickness of the membrane ranges between 0.02 and 200 µm;
   curing said curable monomer mixture by UV radiation to induce polymerization.

8. A method of gas separation comprising using a membrane according to claim 1.

9. Use according to claim 8 wherein said gases to be separated include carbon dioxide ($CO_2$), hydrogen ($H_2$), methane ($CH_4$), nitrogen ($N_2$) and oxygen ($O_2$).

10. A process for separating two components, A and B, of a gas mixture, which process comprises:
   i. passing said gas mixture across a separation membrane having a feed side and a permeate side, said separation membrane having a selective layer produced as defined in claim 7;
   ii. providing a driving force for transmembrane permeation;
   iii. withdrawing from the permeate side a permeate stream enriched in component A compared to the gas mixture; and iv. withdrawing from the feed side a residue stream depleted in component A compared to the gas mixture.

11. A method of gas separation comprising using a membrane produced according to the process of claim 7.

12. The dense poly(ionic liquid)-based membrane according to claim 1, wherein the IL monomer trialkyl[(4-vinylphenyl)alkyl]phosphonium is present in the composition in the amount of 20-30 wt %.

13. The dense poly(ionic liquid)-based membrane according to claim 1, wherein the one or more ethylenically unsaturated co-monomers is present in the composition in the amount of 50-60 wt %.

14. The dense poly(ionic liquid)-based membrane according to claim 1, wherein the one or more ethylenically unsaturated co-monomers comprises acrylates.

15. The dense poly(ionic liquid)-based membrane according to claim 1, wherein the surfactant is present in the composition in the amount of 10-30 wt %.

16. The dense poly(ionic liquid)-based membrane according to claim 1, wherein the one or more cross-linkers is present in the composition in the amount of 2-10 wt %.

17. The dense poly(ionic liquid)-based membrane according to claim 1, wherein the photo-initiator is present in the composition in the amount of 0.1-1 wt %.

\* \* \* \* \*